United States Patent
Hou et al.

(10) Patent No.: US 9,319,839 B2
(45) Date of Patent: Apr. 19, 2016

(54) COVERAGE AREA-CENTRIC DATA TRANSMISSION METHODS AND SYSTEMS

(71) Applicant: Zappoint Corporation, Taipei (TW)

(72) Inventors: Yi-An Hou, Taipei (TW); Hsi-Tsun Chien, Taipei (TW)

(73) Assignee: ZAPPOINT CORPORATION, Taipei (TW)

(*) Notice: Subject to any disclaimer, the term of this patent is extended or adjusted under 35 U.S.C. 154(b) by 0 days.

(21) Appl. No.: 14/788,895

(22) Filed: Jul. 1, 2015

(65) Prior Publication Data

US 2016/0014560 A1    Jan. 14, 2016

(30) Foreign Application Priority Data

Jul. 8, 2014   (TW) .............................. 103123411 A (51) Int. Cl.
*H04W 24/00*     (2009.01)
*H04W 4/02*      (2009.01)
*H04L 29/08*     (2006.01)

(52) U.S. Cl.
CPC ............... *H04W 4/021* (2013.01); *H04L 67/18* (2013.01); *H04W 4/02* (2013.01); *H04W 4/023* (2013.01)

(58) Field of Classification Search
CPC ....... H04W 4/021; H04W 4/02; H04W 4/023; H04L 67/18

USPC ............. 455/456.3, 456.1, 440, 432.1, 456.2, 455/454, 418, 436, 186.1, 421; 370/235, 370/252, 328, 329

See application file for complete search history.

(56) References Cited

U.S. PATENT DOCUMENTS

| | | | |
|---|---|---|---|
| 6,819,919 B1 | 11/2004 | Tanaka | |
| 8,713,187 B2 | 4/2014 | Raboin | |
| 8,892,104 B1* | 11/2014 | Oroskar | H04W 48/20 455/433 |
| 2002/0129119 A1 | 9/2002 | Aoki et al. | |
| 2011/0142016 A1 | 6/2011 | Chatterjee | |
| 2014/0050155 A1* | 2/2014 | Cho | H04W 4/18 370/328 |
| 2015/0045061 A1* | 2/2015 | Da | H04W 4/023 455/456.2 |
| 2015/0264620 A1* | 9/2015 | Timus | H04W 36/32 455/440 |

* cited by examiner

*Primary Examiner* — Dhaval Patel
(74) *Attorney, Agent, or Firm* — McClure, Qualey & Rodack, LLP (57) ABSTRACT

Coverage area-centric data transmission systems and methods are provided. First, the location of an electronic device is obtained, and a coverage area parameter is received. A data transmission coverage area is defined according to the location of the electronic device and the coverage area parameter. Then, specific data corresponding to the electronic device is transmitted to at least one candidate electronic device within the data transmission coverage area.

14 Claims, 11 Drawing Sheets

COVERAGE AREA-CENTRIC DATA TRANSMISSION METHODS AND SYSTEMS

BACKGROUND OF THE INVENTION

1. Field of the Invention

The disclosure relates generally to data transmission methods and systems, and, more particularly to data transmission methods and systems that can determine a data transmission coverage area, and transmit data to the electronic devices in the data transmission coverage area.

2. Description of the Related Art

Recently, electronic devices, such as smart phones, notebooks, wearable devices or other portable devices, have become more and more technically advanced and multifunctional. For example, portable devices have network connectivity capabilities. Users can use their portable devices to connect to networks at anytime and anywhere. The convenience and new functionalities advanced by modern technology have made these devices into necessities of life.

As described, since electronic devices have network connectivity capabilities, electronic devices can obtain data from networks. For example, electronic devices can obtain related information of stores nearby the location of the electronic devices from networks. Additionally, in some cases, electronic devices can transmit data to other electronic devices via networks. For example, when multiple electronic devices in a specific range generate the same motion simultaneously, data such as digital business cards corresponding to the respective electronic devices can be exchanged.

Generally, the data exchange between electronic devices may be regarded as a generalized personal advertising behavior. Traditionally, the content of the advertisement must be pre-designed, and the advertisement must be designated and prepared for specific platforms in advance. Since each platform has its own coverage and population, the content and the transmission coverage of the advertisement are always fixed and lack flexibility. It is apparent that most advertisements do not consider the current requirements of users. For example, advertisers cannot satisfy the requirements of users that change with the passage of time. For example, some users may change locations and the traditional advertising model is not appropriate for users who need local services.

BRIEF SUMMARY OF THE INVENTION

Coverage area-centric data transmission systems and methods are provided, in which a data transmission coverage area can be defined according to the location of an electronic device, and data can be transmitted to other electronic devices within the data transmission coverage area.

In an embodiment of a coverage area-centric data transmission method, the location of an electronic device is obtained, and a coverage area parameter is received. A data transmission coverage area is defined according to the location of the electronic device and the coverage area parameter. Then, specific data corresponding to the electronic device is transmitted to at least one candidate electronic device within the data transmission coverage area.

An embodiment of a coverage area-centric data transmission system comprises a positioning unit, a reception unit, and a processing unit. The positioning unit outputs the location of an electronic device. The reception unit receives a coverage area parameter. The processing unit defines a data transmission coverage area according to the location of the electronic device and the coverage area parameter, and transmits specific data corresponding to the electronic device to at least one candidate electronic device within the data transmission coverage area.

In some embodiments, the location of the electronic device and the coverage area parameter are transmitted to a server via a network. The data transmission coverage area is defined according to the location of the electronic device and the coverage area parameter by the server, and the server transmits the specific data corresponding to the electronic device to the at least one candidate electronic device within the data transmission coverage area.

In some embodiments, it is determined whether a specific candidate electronic device is present within the data transmission coverage area in a predefined interval. When the specific candidate electronic device is present within the data transmission coverage area in the predefined interval, the specific data corresponding to the electronic device is transmitted to the specific candidate electronic device.

In some embodiments, a selection corresponding to a specific content item is received, and the specific data corresponding to the electronic device is transmitted to the at least one candidate electronic device within the data transmission coverage area, in which the specific content item is selected by the at least one candidate electronic device.

In some embodiments, the coverage area parameter is selected from a plurality of candidate coverage area parameters, and the specific content item is selected from a plurality of candidate content items.

In some embodiments, the coverage area parameter and/or the specific content item are recorded, and a billing process is performed according to the coverage area parameter and/or the specific content item.

In some embodiments, a command corresponding to the specific data is received by the at least one candidate electronic device, and a specific process is performed according to the command and the specific data. In some embodiments, when the specific process is performed, the specific data is deleted, the specific data is collected, related information of a user corresponding to the candidate electronic device is provided to the electronic device, and/or a communication session between the candidate electronic device and the electronic device is established.

In some embodiments, the specific data is selected from a plurality of candidate data.

In some embodiments, the coverage area parameter comprises a distance or a region.

In an embodiment of a coverage area-centric data transmission method, the location of a specific electronic device is received from the specific electronic device, and a coverage area parameter is received from the specific electronic device. A data transmission coverage area is defined according to the location of the specific electronic device and the coverage area parameter. Then, specific data corresponding to the specific electronic device is transmitted to at least one candidate electronic device within the data transmission coverage area.

An embodiment of a coverage area-centric data transmission system comprises a network connecting unit and a processing unit. The network connecting unit receives the location of a specific electronic device from the specific electronic device, and receives a coverage area parameter from the specific electronic device. The processing unit defines a data transmission coverage area according to the location of the specific electronic device and the coverage area parameter, and transmits specific data corresponding to the specific electronic device to at least one candidate electronic device within the data transmission coverage area.

Coverage area-centric data transmission methods may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed descriptions with references to the accompanying drawings, wherein.

DETAILED DESCRIPTION OF THE INVENTION

Coverage area-centric data transmission systems and methods are provided.

Figure 1:
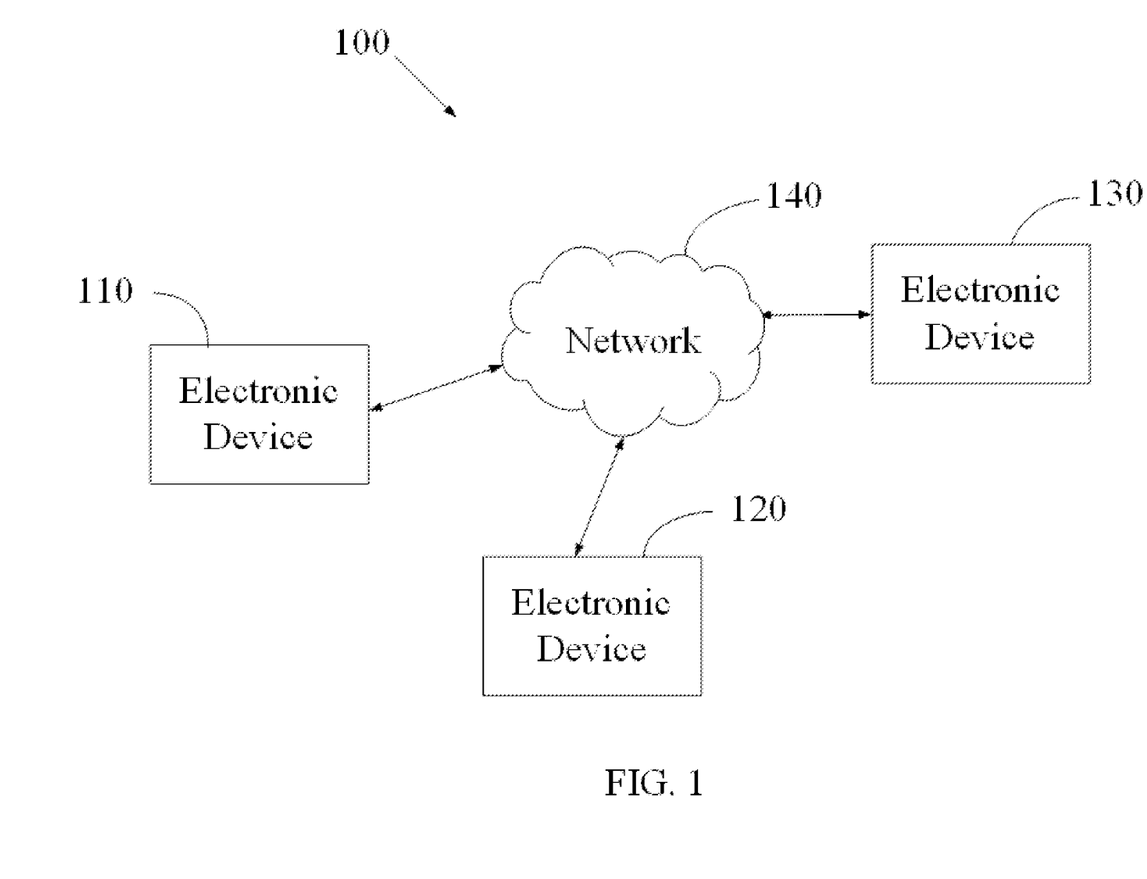
FIG. 1 is a schematic diagram illustrating an embodiment of a coverage area-centric data transmission system of the invention.
Figure 2:
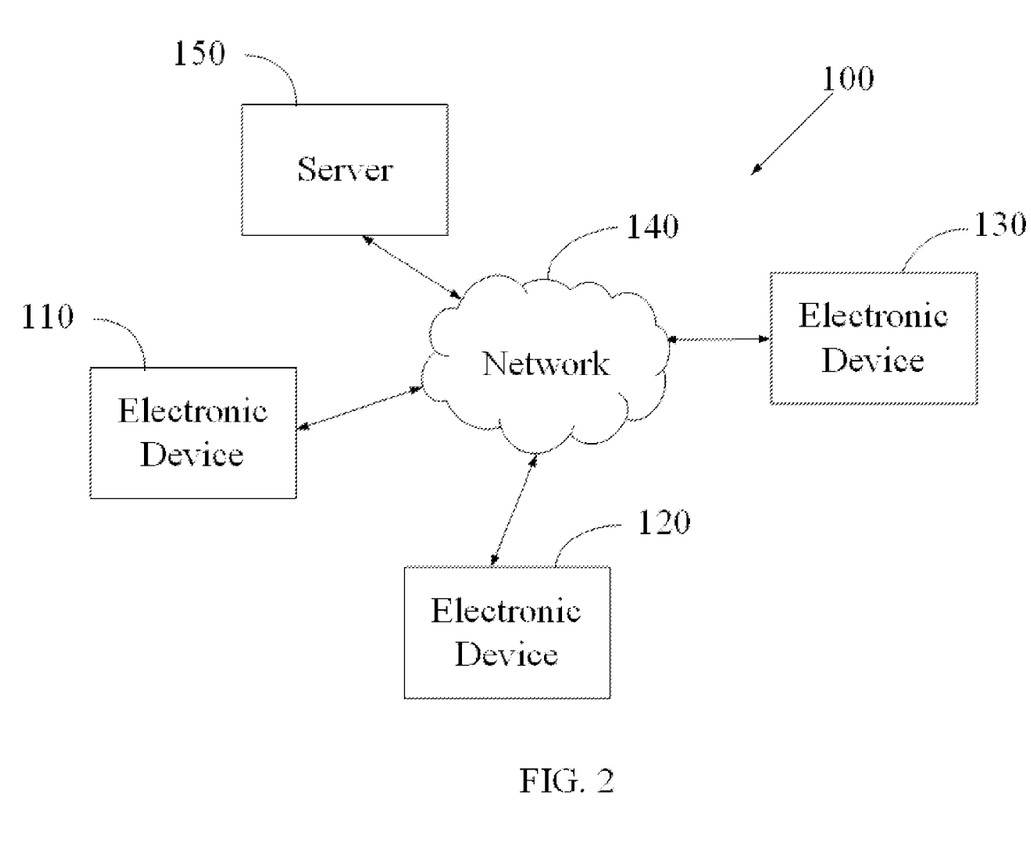
FIG. 2 is a schematic diagram illustrating another embodiment of a coverage area-centric data transmission system of the invention.

FIG. 1 is a schematic diagram illustrating an embodiment of a coverage area-centric data transmission system of the invention. As shown in FIG. 1, the coverage area-centric data transmission system 100 can comprise a plurality of electronic devices (110, 120 and 130). The electronic devices can communicate with each other via a network 140, such as a wired network, a telecommunication network, and/or a wireless network. In some embodiments, each electronic device can connect to a server 150 via the network 140, as shown in FIG. 2. In some embodiments, the server 150 can record specific data corresponding to each electronic device and/or a user corresponding to each electronic device. It is understood that, in some embodiments, the specific data comprises a digital business card, identification data, financial account information, account information corresponding to an application, and/or advertisement data. It is noted that, the specific data above is an example of the application, and the present invention is not limited thereto.

Figure 3:
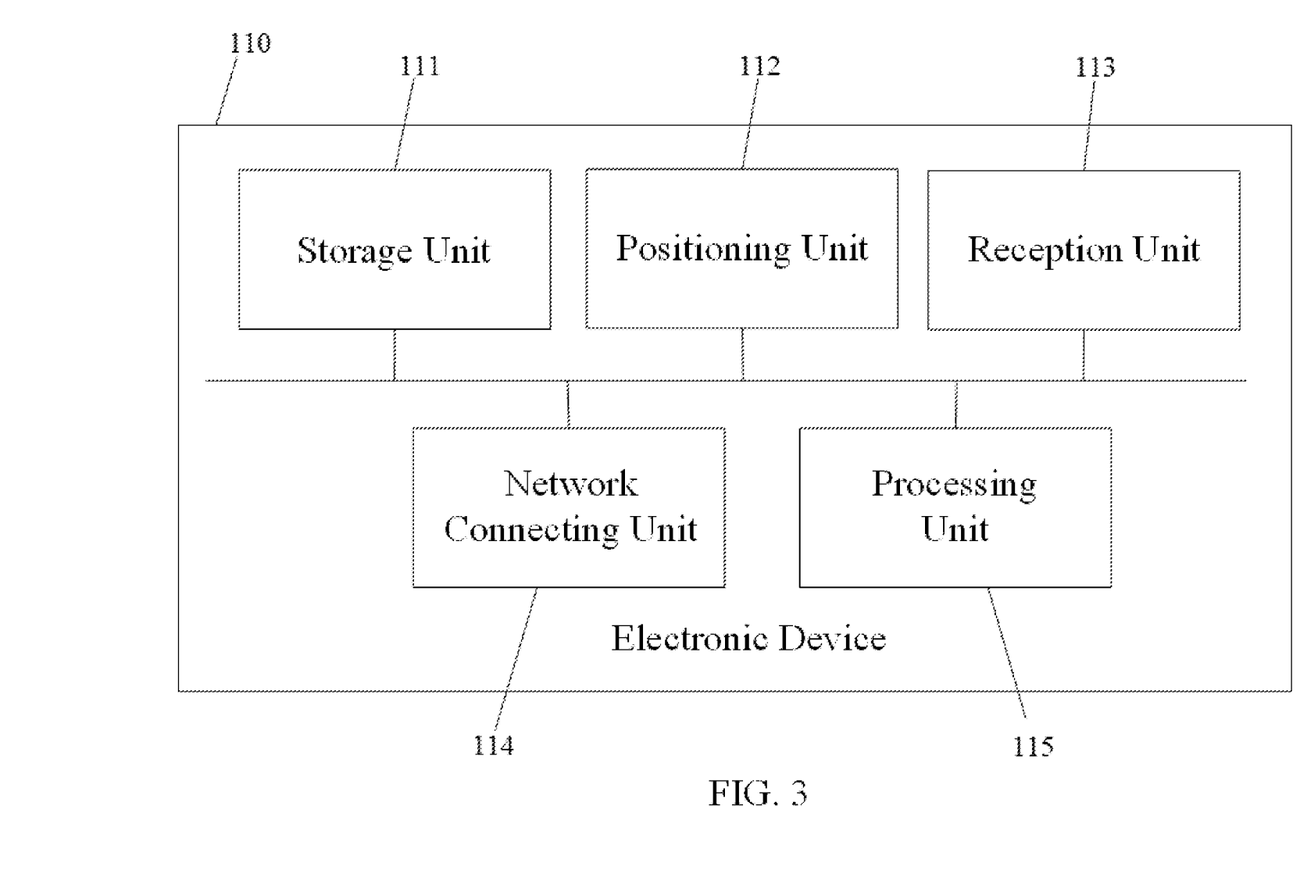
FIG. 3 is a schematic diagram illustrating an embodiment of an electronic device of the invention.

FIG. 3 is a schematic diagram illustrating an embodiment of an electronic device of the invention. The electronic device may be any processor-based electronic device, such as a computer, or a portable device, such as a mobile phone, a smart phone, a PDA (Personal Digital Assistant), a GPS (Global Positioning System), a tablet or a wearable device. As shown in FIG. 3, the electronic device 110 comprises a storage unit 111, a positioning unit 112, a reception unit 113, a network connecting unit 114, and a processing unit 115. The storage unit 111 stores specific data corresponding to the electronic device 110. It is understood that, in some embodiments, the specific data may be a digital business card, identification data, financial account information, account information corresponding to an application, and/or advertisement data. Similarly, the specific data above is an example of the application, and the present invention is not limited thereto. The positioning unit 112 may be a GPS for communicating with at least one satellite to know the location of the electronic device 110. For example, the location may be a geographical location which is defined by the longitude and latitude. The reception unit 113 can receive an instruction or selection from a user. It is understood that, in some embodiments, the electronic device 110 can further comprise a display unit (not shown in FIG. 3) for displaying related information, such as images, interfaces, and related data. In some embodiments, the display unit may be a touch-sensitive screen, and the reception unit 113 may be the touch-sensitive screen. That is users can directly input related instructions or selections to the electronic device 110 via the touch-sensitive screen. The electronic device 110 can have network connectivity capabilities for connecting to a network, such as a wired network, a telecommunication network, and/or a wireless network by using the network connecting unit 114. The processing unit 115 can control related operations of hardware and software in the electronic device 110, and perform the coverage area-centric data transmission methods, which will be discussed later.

Figure 4:
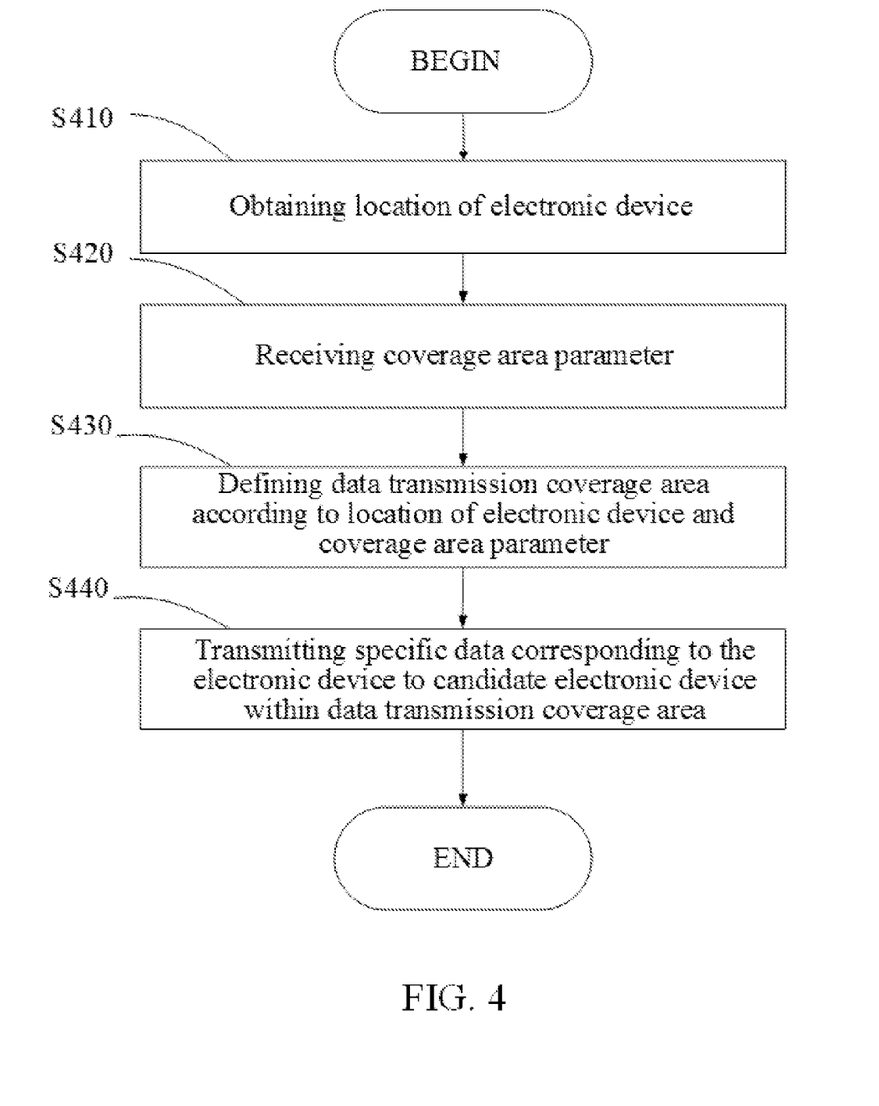
FIG. 4 is a flowchart of an embodiment of a coverage area-centric data transmission method of the invention.

FIG. 4 is a flowchart of an embodiment of a coverage area-centric data transmission method of the invention. The coverage area-centric data transmission method can be used in an electronic device, such as a computer, or a portable device, such as a mobile phone, a smart phone, a PDA, a GPS, a tablet or a wearable device.

In step S410, the location of the electronic device is obtained. It is understood that, in some embodiments, the electronic device can have a positioning unit, such as a GPS, and the location of the electronic device can be obtained from the positioning unit. In step S420, a coverage area parameter is received. It is understood that, in some embodiments, the coverage area parameter comprises a distance or a region. In some embodiments, the electronic device can display a user interface, and selections corresponding to a plurality of candidate distances can be provided in the user interface. The candidate distances may comprise 100 m, 500 m, 1 km, 10 km, 50 km, and 100 km. It is noted that, the above candidate distances are examples of the application, and the present invention is not limited thereto. Users can select a specific distance from the candidate distances. In some embodiments, the electronic device can display a user interface, and selections corresponding to a plurality of candidate regions can be provided in the user interface. The candidate regions may comprise a building, streets, a park, and an area. Similarly, the above candidate regions are examples of the application, and the present invention is not limited thereto. Users can select a specific region from the candidate regions. Then, in step S430, a data transmission coverage area is defined according to the location of the electronic device and the coverage area parameter. It is understood that, in some embodiments, data transmission coverage area may be a circular area, in which the circular are has a radius of the specific distance, and the center of the circular area is the location of the electronic device. In some embodiments, map data can be obtained according to the location of the electronic device, and users can select a specific region or object from the map data to define the data transmission coverage area. Then, in step S440, specific data corresponding to the electronic device is transmitted to at least one candidate electronic device within the data transmission coverage area. It is understood that, in some embodiments, the electronic device may have a plurality of candidate data, and the specific data can be selected from the candidate data. It is understood that, in some embodiments, the specific data may be a digital business card, identification data, financial account information, account information corresponding to an application, and/or advertisement data. In some embodiments, the specific data may be one of the digital business cards or one of the advertisement data. Similarly, the specific data above is an example of the application, and the present invention is not limited thereto. Further, it is noted that, the location of the candidate electronic device can be obtained, and the location of the candidate electronic device can be used to determine whether the candidate electronic device is within the data transmission coverage area.

Figure 5:
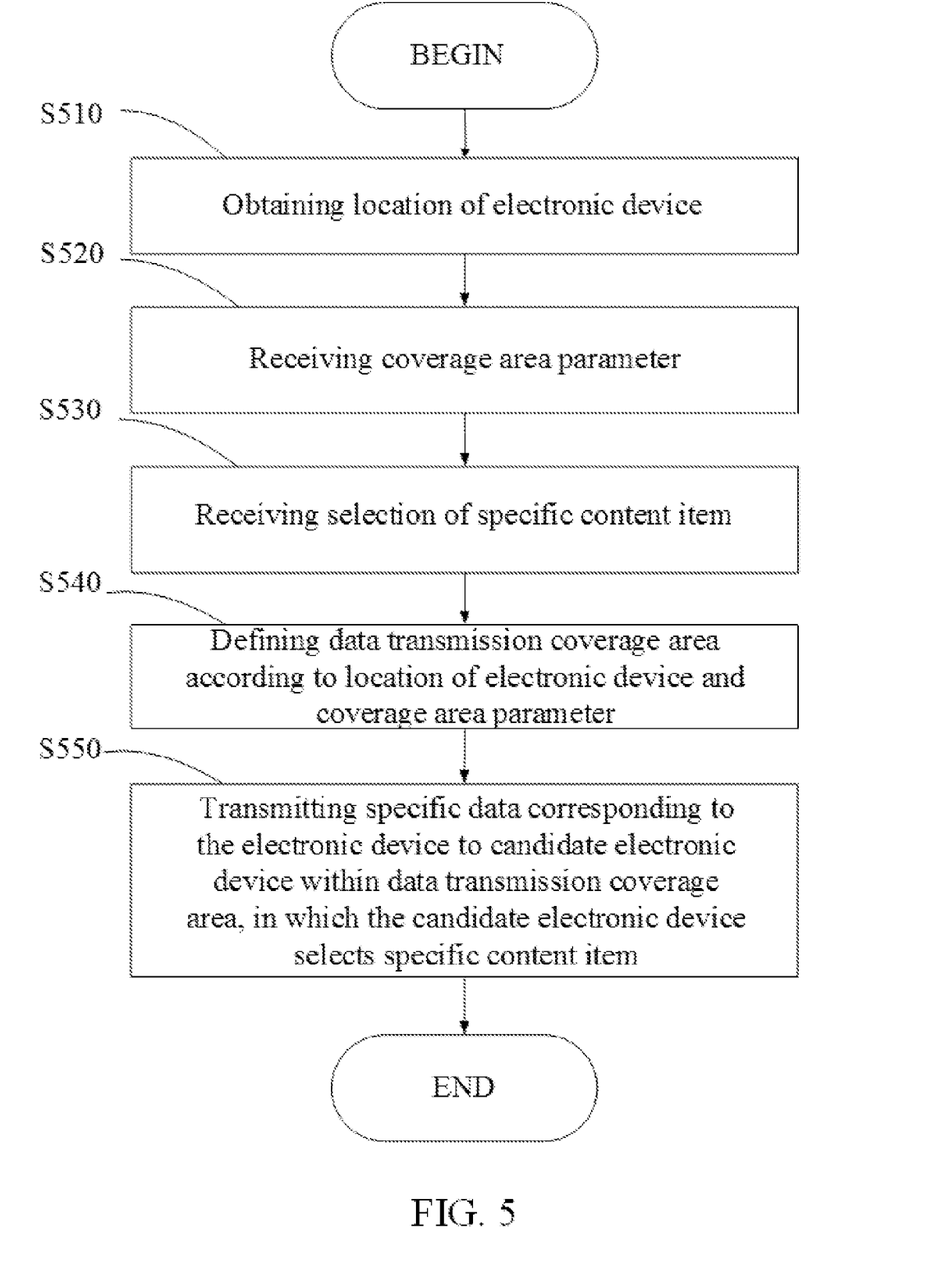
FIG. 5 is a flowchart of another embodiment of a coverage area-centric data transmission method of the invention.

FIG. 5 is a flowchart of another embodiment of a coverage area-centric data transmission method of the invention. The coverage area-centric data transmission method can be used in an electronic device, such as a computer, or a portable device, such as a mobile phone, a smart phone, a PDA, a GPS, a tablet or a wearable device.

In step S510, the location of the electronic device is obtained. Similarly, in some embodiments, the electronic device can have a positioning unit, such as a GPS, and the location of the electronic device can be obtained from the positioning unit. In step S520, a coverage area parameter is received. Similarly, in some embodiments, the coverage area parameter comprises a distance or a region. In some embodiments, the electronic device can display a user interface, and selections corresponding to a plurality of candidate distances can be provided in the user interface. Users can select a specific distance from the candidate distances. In some embodiments, the electronic device can display a user interface, and selections corresponding to a plurality of candidate regions can be provided in the user interface. The candidate regions may comprise a building, streets, a park, and an area. Similarly, the above candidate regions are examples of the application, and the present invention is not limited thereto. Users can select a specific region from the candidate regions. Then, in step S530, a selection corresponding to a specific content item is received. It is understood that, in some embodiments, multiple candidate content items can be defined. For example, the candidate content items may comprise a life item, a financial management item, and a travel item. It is noted that, the above candidate content items are examples of the application, and the present invention is not limited thereto. Further, these items can be defined in different names, such as channels or attributes, and the present invention is not limited to any name. Users can select a specific content item from the candidate content items. Then, in step S540, a data transmission coverage area is defined according to the location of the electronic device and the coverage area parameter. Similarly, in some embodiments, data transmission coverage area may be a circular area, in which the circular are has a radius of the specific distance, and the center of the circular area is the location of the electronic device. In some embodiments, map data can be obtained according to the location of the electronic device, and users can select a specific region or object from the map data to define the data transmission coverage area. Then, in step S550, specific data corresponding to the electronic device is transmitted to at least one candidate electronic device within the data transmission coverage area, in which the specific content item is selected by the at least one candidate electronic device. Similarly, in some embodiments, the electronic device may have a plurality of candidate data, and the specific data can be selected from the candidate data. It is understood that, in some embodiments, the specific data may be a digital business card, identification data, financial account information, account information corresponding to an application, and/or advertisement data. In some embodiments, the specific data may be one of the digital business cards or one of the advertisement data. Similarly, the specific data above is an example of the application, and the present invention is not limited thereto. Additionally, when a candidate electronic device within the data transmission coverage area does not select the specific content item, the candidate electronic device will not receive the specific data corresponding to the electronic device. Further, it is noted that, the location of the candidate electronic device can be obtained, and the location of the candidate electronic device can be used to determine whether the candidate electronic device is within the data transmission coverage area.

Figure 6:
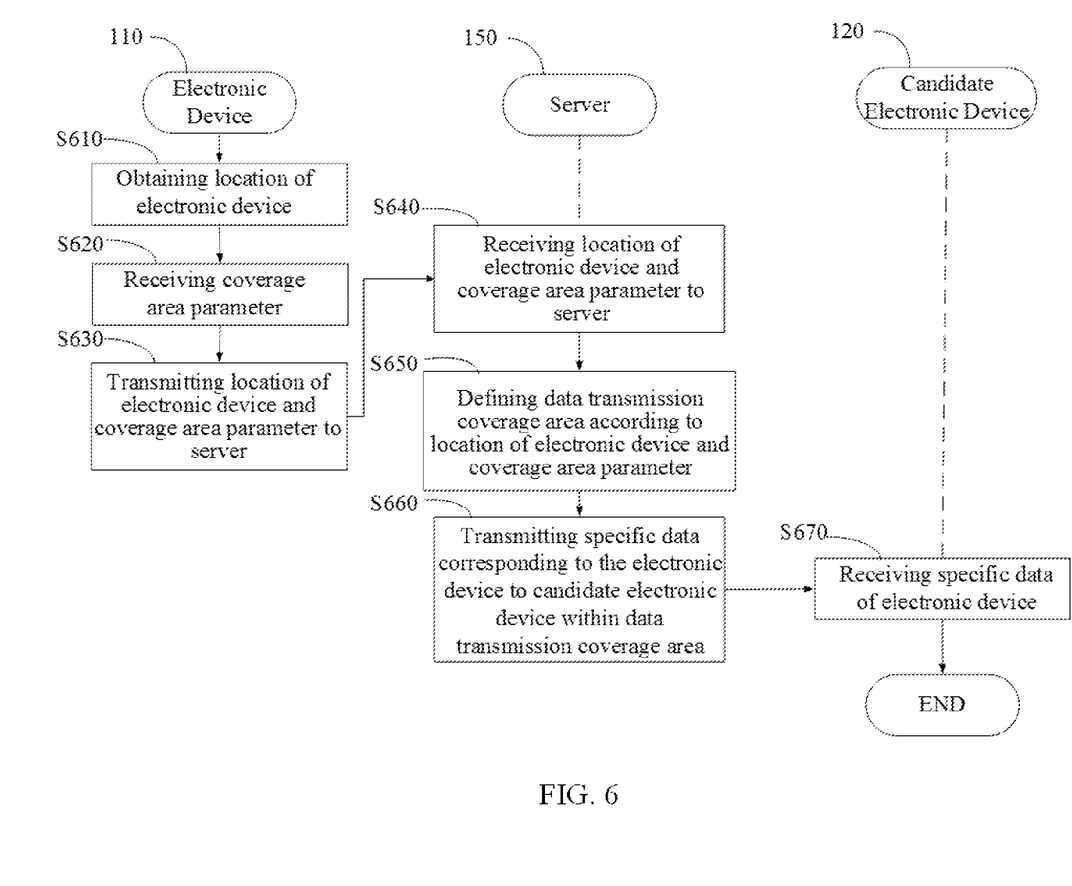
FIG. 6 is a flowchart of another embodiment of a coverage area-centric data transmission method of the invention.

FIG. 6 is a flowchart of another embodiment of a coverage area-centric data transmission method of the invention. In the embodiment, the data transmission between electronic devices is performed via a server. The electronic device may be a computer, or a portable device, such as a mobile phone, a smart phone, a PDA, a GPS, a tablet or a wearable device.

In step S610, the location of the electronic device 110 is obtained. Similarly, in some embodiments, the electronic device 110 can have a positioning unit, such as a GPS, and the location of the electronic device 110 can be obtained from the positioning unit. In step S620, a coverage area parameter is received. Similarly, in some embodiments, the coverage area parameter comprises a distance or a region. In some embodiments, the electronic device 110 can display a user interface, and selections corresponding to a plurality of candidate distances can be provided in the user interface. Users can select a specific distance from the candidate distances. In some embodiments, the electronic device 110 can display a user interface, and selections corresponding to a plurality of candidate regions can be provided in the user interface. The candidate regions may comprise a building, streets, a park, and an area. Similarly, the above candidate regions are examples of the application, and the present invention is not limited thereto. Users can select a specific region from the candidate regions. Then, in step S630, a data transmission request comprising the location of the electronic device 110 and the coverage area parameter is transmitted to the server 150. At the time, in step S640, the server 150 receives the data transmission request from the electronic device 110. It is understood that, in some embodiments, the electronic device can receive a selection of a specific content item from a plurality of candidate content items. The electronic device can further transmit the selection of the specific content item to the server 150. In step S650, the server 150 defines a data transmission coverage area according to the location of the electronic device and the coverage area parameter. Similarly, in some embodiments, data transmission coverage area may be a circular area, in which the circular are has a radius of the specific distance, and the center of the circular area is the location of the electronic device. In some embodiments, map data can be obtained according to the location of the electronic device, and users can select a specific region or object from the map data to define the data transmission coverage area. Then, in step S660, the server transmits specific data corresponding to the electronic device 110 to at least one candidate electronic device 120 within the data transmission coverage area. At the time, in step S670, the candidate electronic device 120 receives the specific data corresponding to the electronic device 110. It is understood that, in some embodiments, the specific data may be a digital business card, identification data, financial account information, account information corresponding to an application, and/or advertisement data. In some embodiments, the specific data may be one of the digital business cards or one of the advertisement data. Similarly, the specific data above is an example of the application, and the present invention is not limited thereto. Further, it is noted that, the location of the respective candidate electronic device can be provided to the server 150, and the location of the respective candidate electronic device can be used to determine whether the respective candidate electronic device is within the data transmission coverage area.

As described, in some embodiments, when the server 150 receives the selection of the specific content item from the electronic device 110, the server 150 transmits the specific data corresponding to the electronic device 110 to the candidate electronic device within the data transmission coverage area, in which the specific content item is selected by the candidate electronic device. It is understood that, in some embodiments, the electronic device 110 can transmit the specific data to the server 150, and then the server 150 transmits the specific data to the candidate electronic device 120. In some embodiments, the specific data corresponding to the electronic device 110 can be directly transmitted to the candidate electronic device 120 by the server 150. Additionally, in some embodiments, the electronic device 110 can have a plurality of candidate data, and the specific data can be selected from the candidate data. The selection of the specific data can be transmitted to the server 150, and the server 150 can transmit the selected specific data to the candidate electronic device 120 according to the selection. It is understood that, in some embodiments, the server 150 can record the data transmission request received from the electronic device 110, and perform a billing process according to the specific distance and/or the specific content item recorded in the data transmission request.

FIGS. 7A~7D are schematic diagrams illustrating an example of coverage area-centric data transmission of the invention.

Figure 7A:
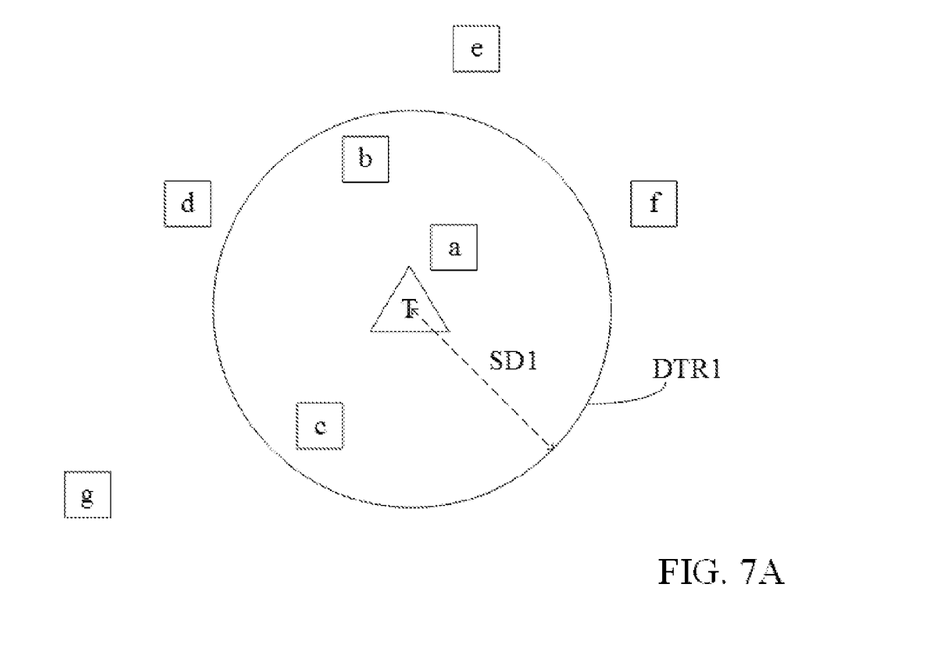
FIGS. 7A-7D are schematic diagrams illustrating an example of coverage area-centric data transmission of the invention.
Figure 7B:
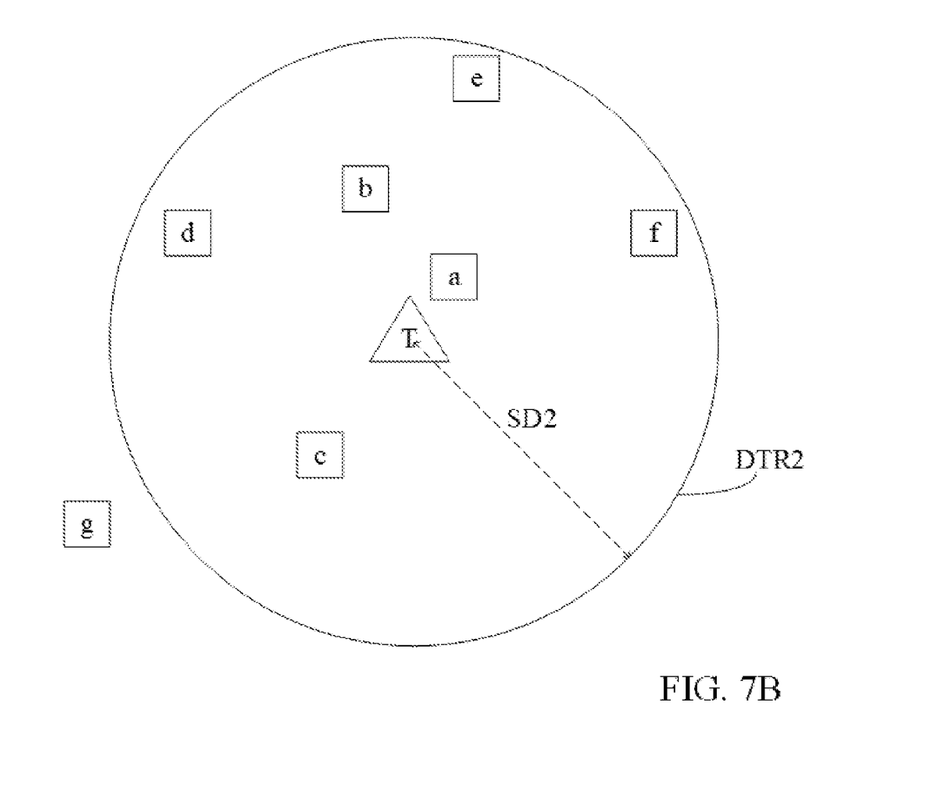
Figure 7C:
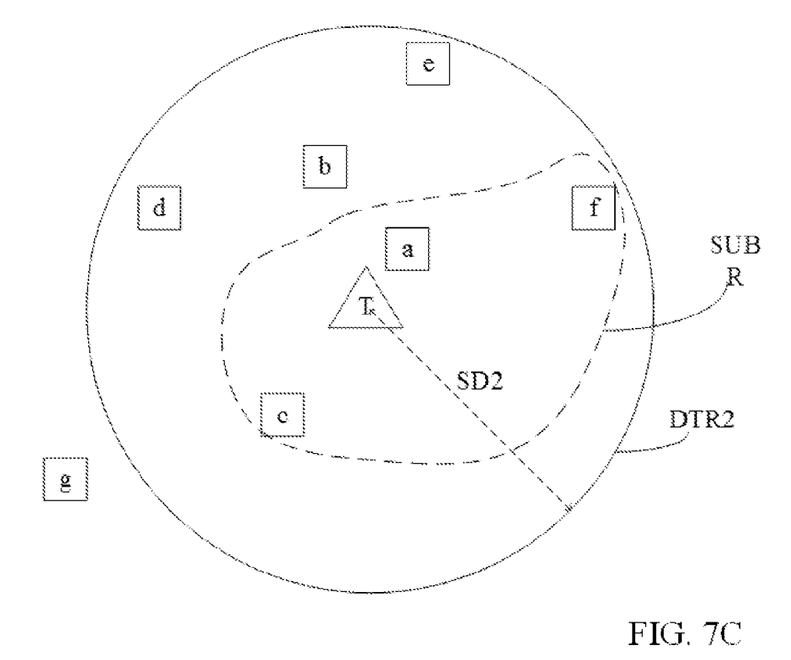
Figure 7D:
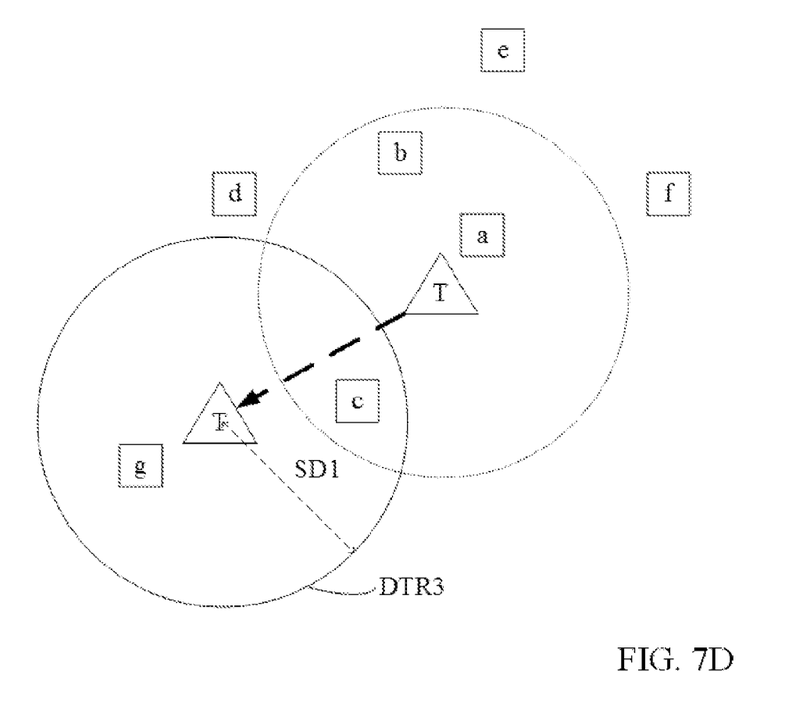

As shown in FIG. 7A, the electronic device T can determine a first specific distance SD1, and perform a transmission process for specific data. A first data transmission coverage area DTR1 is defined according to the current location of the electronic device T and the first specific distance SD1. The candidate electronic devices a, b and c within the first data transmission coverage area DTR1 will receive the specific data of the electronic device T. At this time, the candidate electronic devices d, e, f and g will not receive the specific data of the electronic device T. When the electronic device T determines a second specific distance SD2, a second data transmission coverage area DTR2 is defined according to the current location of the electronic device T and the second specific distance SD2. The candidate electronic devices a, b, c, d, e and f within the second data transmission coverage area DTR2 will receive the specific data of the electronic device T, as shown in FIG. 7B. At this time, the candidate electronic device g will not receive the specific data of the electronic device T. As described, in some embodiments, a user can select a specific region or object from map data, and the selected specific region or object can be defined as the data transmission coverage area. In the example, the user can select a sub-area SUBR in the second data transmission coverage area DTR2, as shown in FIG. 7C. The candidate electronic devices a, c and f within the sub-area SUBR will receive the specific data of the electronic device T. When the electronic device T moves, and determines the first specific distance SD1, a third data transmission coverage area DTR3 is defined according to the current location of the electronic device T and the first specific distance SD1. The candidate electronic devices c and g within the third data transmission coverage area DTR3 will receive the specific data of the electronic device T, as shown in FIG. 7D. At this time, the candidate electronic devices a, b, d, e and f will not receive the specific data of the electronic device T. It is noted that, the specific data of the electronic device T can be directly transmitted to the candidate electronic device, or transmitted to the candidate electronic device via a server.

Figure 8:
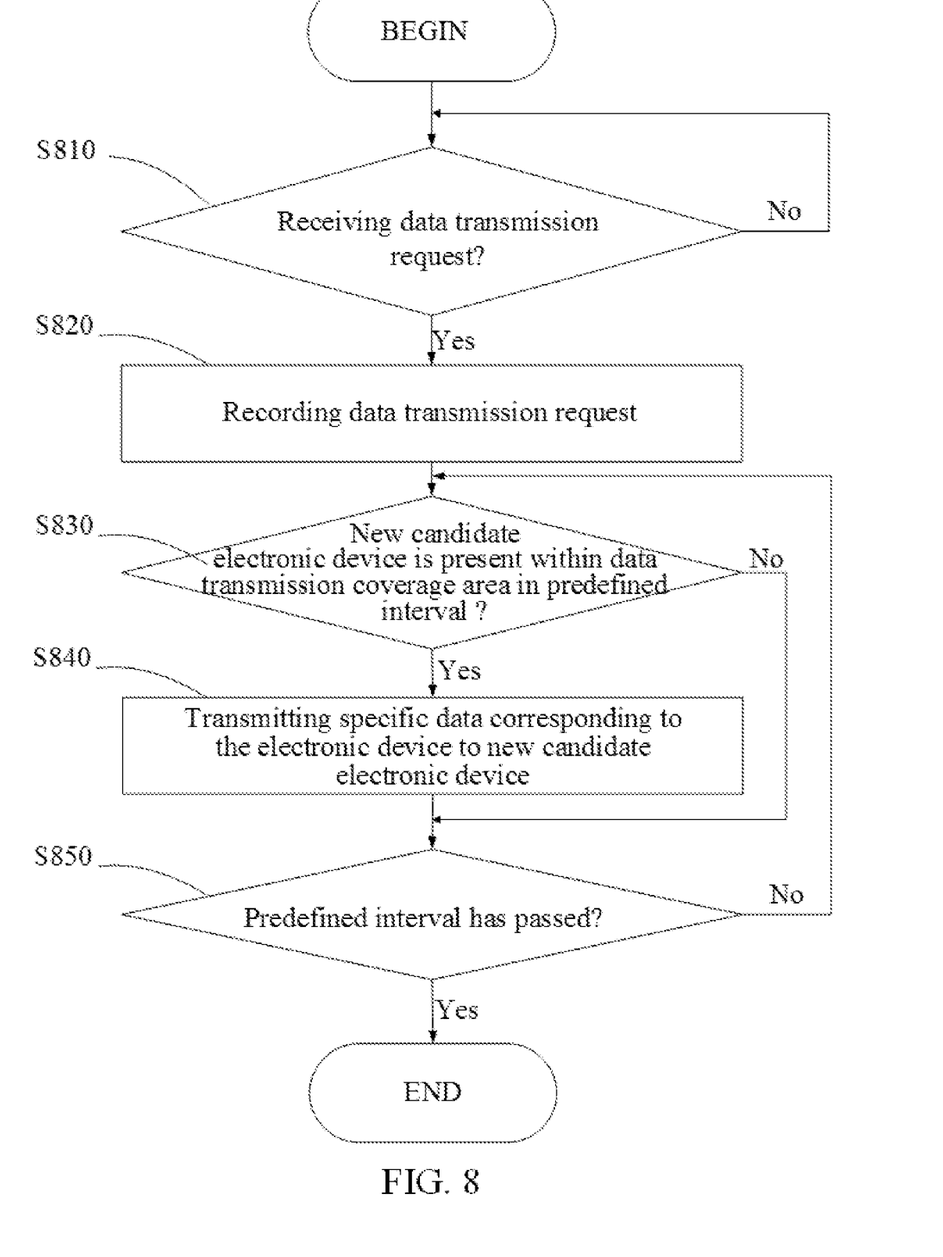
FIG. 8 is a flowchart of another embodiment of a coverage area-centric data transmission method of the invention.

FIG. 8 is a flowchart of an embodiment of a coverage area-centric data transmission method of the invention. The coverage area-centric data transmission method can be used in an electronic device, such as a computer, or a portable device, such as a mobile phone, a smart phone, a PDA, a GPS, a tablet or a wearable device. In the embodiment, after the electronic device generates a data transmission request, candidate electronic devices which enter the data transmission coverage area in a predefined interval will receive specific data corresponding to the electronic device.

In step S810, it is determined whether a data transmission request is received from a specific electronic device. It is noted that, the data transmission request can comprise the location of the specific electronic device and a coverage area parameter. In some embodiments, the data transmission request can comprise a specific content item. When the data transmission request is not received from the specific electronic device (No in step S810), the procedure remains at step S810. When the data transmission request is received from the specific electronic device (Yes in step S810), in step S820, the data transmission request is recorded. It is noted that, a data transmission coverage area can be defined according to the location of the specific electronic device and the coverage area parameter. At the time, at least one candidate electronic device within the data transmission coverage area will receive the specific data corresponding to the specific electronic device. In step S830, it is determined whether a new candidate electronic device is present in the data transmission coverage area in a predefined interval, in which the predefined interval begins from the time when the data transmission request is received. When no new candidate electronic device is present in the data transmission coverage area in the predefined interval (No in step S830), the procedure goes to step S850. When a new candidate electronic device is present in the data transmission coverage area in the predefined interval (Yes in step S830), in step S840, the specific data corresponding to the specific electronic device is transmitted to the new candidate electronic device. Then, in step S850, it is determined whether the predefined interval has passed. When the predefined interval has not passed yet (No in step S850), the procedure returns to step S830. When the predefined interval has passed (Yes in step S850), the procedure is completed.

Figure 9:
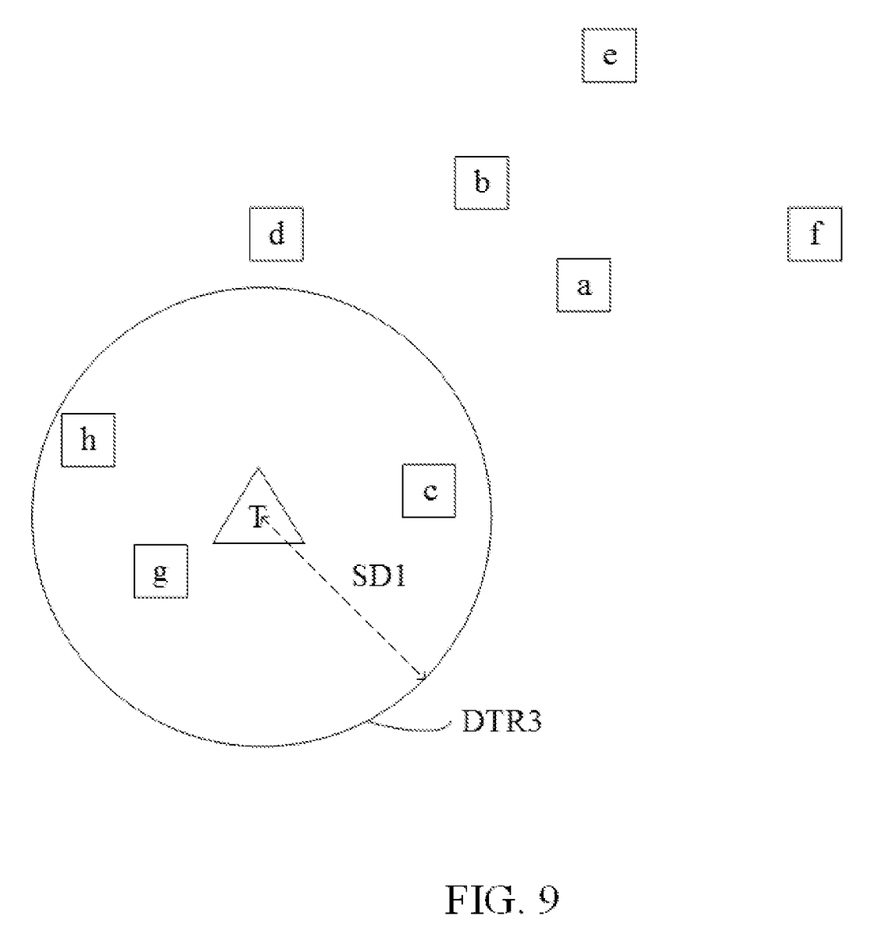
FIG. 9 is an schematic diagram illustrating an example of coverage area-centric data transmission of the invention.

Referring to the example in FIG. 7C, when a new candidate electronic device h is present within the third data transmission coverage area DTR3, in addition to the candidate electronic devices c and g who have already received the specific data corresponding to the electronic device T, the new candidate electronic device h will also receive the specific data corresponding to the electronic device T, as shown in FIG. 9. Similarly, the specific data of the electronic device T can be directly transmitted to the candidate electronic device h, or transmitted to the candidate electronic device h via a server.

Figure 10:
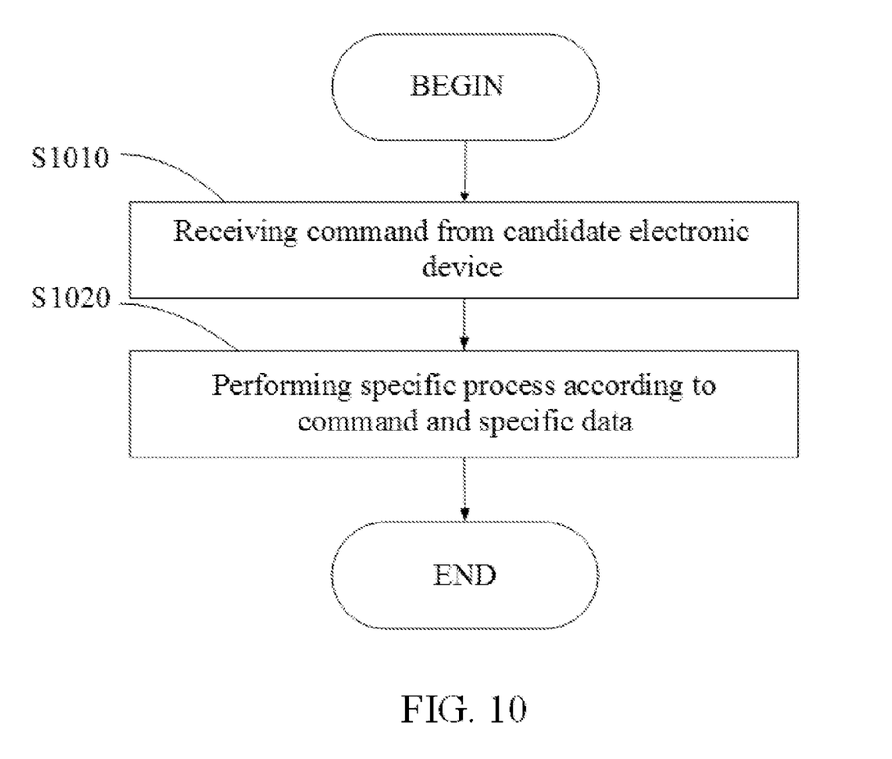
FIG. 10 is a flowchart of another embodiment of a coverage area-centric data transmission method of the invention.

FIG. 10 is a flowchart of another embodiment of a coverage area-centric data transmission method of the invention. The coverage area-centric data transmission method can be used in an electronic device, such as a computer, or a portable device, such as a mobile phone, a smart phone, a PDA, a GPS, a tablet or a wearable device. In the embodiment, the candidate electronic devices receiving the specific data can perform related processes according to the received specific data.

In step S1010, a command corresponding to the specific data is received from at least one candidate electronic device, and in step S1020, a specific process is performed according to the command and the specific data. It is understood that, in some embodiments, when the specific process is performed, the specific data can be deleted or collected. In some embodiments, when the specific process is performed, related information, such as contact information comprising a phone number, an email address, and/or account information of a network communication application of a user corresponding to the candidate electronic device can be provided to the electronic device. In some embodiments, when the specific process is performed, a communication session between the candidate electronic device and the electronic device can be established, such that the users of the candidate electronic device and the electronic device can communicate with each other in real-time. In some embodiments, the number of the devices, device information, and user information corresponding to the candidate electronic devices from whom the specific data is collected can be recorded for gathering statistics and management. The statistics can be provided to the electronic device that transmits the specific data. It is noted that, the above specific processes are examples of the application, and the present invention is not limited thereto.

Therefore, the coverage area-centric data transmission methods and systems of the present invention can dynamically define the data transmission coverage area according to the location of the electronic device, and optionally select different data for transmission to other electronic devices within the coverage area, thereby increasing the applicability and accuracy of data transmission between electronic devices.

Coverage area-centric data transmission methods may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalent.

What is claimed is:

1. A coverage area-centric data transmission method for use in an electronic device, comprising:
   obtaining a location of the electronic device;
   receiving a coverage area parameter;
   defining a data transmission coverage area according to the location of the electronic device and the coverage area parameter;
   obtaining the location of at least one candidate electronic device;
   determining whether the at least one candidate electronic device is within the data transmission coverage area according to the location of the at least one candidate electronic device; and
   when the at least one candidate electronic device is within the data transmission coverage area, transmitting specific data corresponding to the electronic device to the at least one candidate electronic device within the data transmission coverage area.

2. The method of claim 1, further comprising transmitting the location of the electronic device and the coverage area parameter to a server via a network, wherein the data transmission coverage area is defined according to the location of the electronic device and the coverage area parameter by the server, and the server transmits the specific data corresponding to the electronic device to the at least one candidate electronic device within the data transmission coverage area.

3. The method of claim 1, further comprising:
   determining whether a specific candidate electronic device is present within the data transmission coverage area in a predefined interval; and
   when the specific candidate electronic device is present within the data transmission coverage area in the predefined interval, transmitting the specific data corresponding to the electronic device to the specific candidate electronic device.

4. The method of claim 1, further comprising receiving a selection corresponding to a specific content item, wherein the specific data corresponding to the electronic device is transmitted to the at least one candidate electronic device within the data transmission coverage area, in which the specific content item is selected by the at least one candidate electronic device.

5. The method of claim 4, further comprising selecting the coverage area parameter from a plurality of candidate coverage area parameters, and selecting the specific content item from a plurality of candidate content items.

6. The method of claim 4, further comprising recording the coverage area parameter or the specific content item, and performing a billing process according to the coverage area parameter or the specific content item.

7. The method of claim 1, further comprising receiving a command corresponding to the specific data by the at least one candidate electronic device, and performing a specific process according to the command and the specific data.

8. The method of claim 7, wherein when the specific process is performed, the specific data is deleted, the specific data is collected, related information of a user corresponding to the candidate electronic device is provided to the electronic device, or a communication session between the candidate electronic device and the electronic device is established.

9. The method of claim 1, further comprising receiving a selection corresponding to the specific data from a plurality of candidate data.

10. The method of claim 1, wherein the coverage area parameter comprises a distance or a region.

11. A coverage area-centric data transmission method for use in an electronic device, comprising:
   receiving a location of a specific electronic device from the specific electronic device;
   receiving a coverage area parameter from the specific electronic device;
   defining a data transmission coverage area according to the location of the specific electronic device and the coverage area parameter;

receiving the location of at least one candidate electronic device;

determining whether the at least one candidate electronic device is within the data transmission coverage area according to the location of the at least one candidate electronic device; and when the at least one candidate electronic device is within the data transmission coverage area, transmitting specific data corresponding to the specific electronic device to the at least one candidate electronic device within the data transmission coverage area.

12. A coverage area-centric data transmission system for use in an electronic device, comprising:

a positioning circuit outputting a location of the electronic device;

a reception circuit receiving a coverage area parameter, and the location of at least one candidate electronic device; and a processing circuit defining a data transmission coverage area according to the location of the electronic device and the coverage area parameter, determining whether the at least one candidate electronic device is within the data transmission coverage area according to the location of the at least one candidate electronic device, and when the at least one candidate electronic device is within the data transmission coverage area, transmitting specific data corresponding to the electronic device to the at least one candidate electronic device within the data transmission coverage area.

13. A coverage area-centric data transmission system for use in an electronic device, comprising:

a network connecting circuit receiving a location of at least one candidate electronic device, receiving the location of a specific electronic device, and receiving a coverage area parameter from the specific electronic device; and a processing circuit defining a data transmission coverage area according to the location of the specific electronic device and the coverage area parameter, determining whether the at least one candidate electronic device is within the data transmission coverage area according to the location of the at least one candidate electronic device, and when the at least one candidate electronic device is within the data transmission coverage area, transmitting specific data corresponding to the specific electronic device to the at least one candidate electronic device within the data transmission coverage area.

14. A non-transitory machine-readable storage medium comprising a computer program, which, when executed, causes a device to perform a coverage area-centric data transmission method, wherein the method comprises:

receiving a location of a specific electronic device from the specific electronic device;

receiving a coverage area parameter from the specific electronic device;

defining a data transmission coverage area according to the location of the specific electronic device and the coverage area parameter;

receiving the location of at least one candidate electronic device;

determining whether the at least one candidate electronic device is within the data transmission coverage area according to the location of the at least one candidate electronic device; and when the at least one candidate electronic device is within the data transmission coverage area, transmitting specific data corresponding to the specific electronic device to the at least one candidate electronic device within the data transmission coverage area.

* * * * *